(12) United States Patent
Kim et al.

(10) Patent No.: US 9,989,108 B2
(45) Date of Patent: Jun. 5, 2018

(54) METHOD FOR DETERMINING CONNECTION STATE OF ENGINE CLUTCH

(71) Applicant: HYUNDAI MOTOR COMPANY, Seoul (KR)

(72) Inventors: Yeon Bok Kim, Seongnam-si (KR); Chan Ho Lee, Seoul (KR); Song Il Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/374,422

(22) Filed: Dec. 9, 2016

(65) Prior Publication Data

US 2018/0066718 A1 Mar. 8, 2018

(30) Foreign Application Priority Data

Sep. 5, 2016 (KR) .......................... 10-2016-0113584

(51) Int. Cl.
*F16D 48/06* (2006.01)
*B60K 6/48* (2007.10)
*B60W 20/00* (2016.01)

(52) U.S. Cl.
CPC ................ *F16D 48/06* (2013.01); *B60K 6/48* (2013.01); *B60W 20/00* (2013.01); *B60Y 2200/92* (2013.01); *F16D 2500/3024* (2013.01); *F16D 2500/3026* (2013.01); *F16D 2500/3067* (2013.01); *F16D 2500/3069* (2013.01);
(Continued)

(58) Field of Classification Search
CPC ............ F16D 48/06; F16D 2500/3024; F16D 2500/3026; F16D 2500/30401; F16D 2500/30406; F16D 2500/30412; F16D 2500/30421; F16D 2500/3067; F16D 2500/3069
See application file for complete search history.

(56) References Cited

U.S. PATENT DOCUMENTS

| 2010/0282561 | A1* | 11/2010 | Rinck | .................... F16D 48/06 192/48.3 |
| 2013/0213760 | A1* | 8/2013 | Wilson | .................. F16D 48/066 192/85.63 |
| 2016/0101769 | A1* | 4/2016 | Gibson | ................. B60W 20/00 477/5 |

FOREIGN PATENT DOCUMENTS

| JP | 3445890 B2 | 9/2003 |
| JP | 2005-218221 A | 8/2005 |

(Continued)

OTHER PUBLICATIONS

Korean office action issued in Application No. 10-2016-0113584 dated Jul. 20, 2017.

*Primary Examiner* — Edwin A Young
(74) *Attorney, Agent, or Firm* — McDermott Will & Emery LLP

(57) ABSTRACT

A method for determining a connection state of an engine clutch includes: a stroke sensing operation of sensing, by a controller, a change of an actuator stroke of the engine clutch; a first pressure comparing operation of determining whether or not an actuator pressure of the engine clutch exceeds a first set pressure and is then changed to below the first set pressure when the actuator stroke is increased; a torque comparing operation of comparing transfer a torque of the engine clutch with a set torque when the actuator pressure exceeds the first set pressure and is then operated to below the first set pressure; and an open determining operation of determining that the engine clutch is in an open state when the transfer torque of the engine clutch is the set torque or less.

8 Claims, 4 Drawing Sheets

(52) U.S. Cl.
CPC .......... *F16D 2500/30401* (2013.01); *F16D 2500/30406* (2013.01); *F16D 2500/30412* (2013.01); *F16D 2500/30421* (2013.01); *Y10S 903/903* (2013.01)

(56) References Cited

FOREIGN PATENT DOCUMENTS

| | | | |
|---|---|---|---|
| JP | 2008-120224 | A | 5/2008 |
| JP | 2011-052560 | A | 3/2011 |
| JP | 2013-181649 | A | 9/2013 |
| KR | 2010-0011135 | A | 2/2010 |
| KR | 10-0974753 | B1 | 8/2010 |
| KR | 10-1509985 | B1 | 4/2015 |

* cited by examiner

METHOD FOR DETERMINING CONNECTION STATE OF ENGINE CLUTCH

CROSS REFERENCE TO RELATED APPLICATION

This application claims the benefit of priority to Korean Patent Application No. 10-2016-0113584 filed on Sep. 5, 2016, which hereby incorporated by reference in its entirety into this application.

TECHNICAL FIELD

The present disclosure relates to a method for determining a connection state of an engine clutch that accurately classifies and determines an open state, a slip state, or a lock up state of the engine clutch.

BACKGROUND

In order to prevent sudden unintended acceleration of a vehicle and to secure safe of the vehicle, a related art discloses preventing motor torque and engine torque from being intactly transferred to a drive shaft due to a re-starting of the vehicle by preventing an idle stop release and a key starting in advance by calculating a speed difference between a front stage and a rear stage of the clutch in a clutch open control mode to determine a fixed state of a clutch.

The matters described as the related art have been provided only for assisting in the understanding for the background of the present disclosure and should not be considered as corresponding the related art known to those skilled in the art.

SUMMARY

An object of the present disclosure is to provide a method for determining a connection state of an engine clutch that accurately determines the connection state of the engine clutch using actuator pressure of the engine clutch, actuator stroke, a speed difference between front and rear stages of the engine clutch, and the like.

According to an exemplary embodiment of the present disclosure, a method for determining a connection state of an engine clutch including: a stroke sensing operation of sensing, by a controller, a change of an actuator stroke of the engine clutch; a first pressure comparing operation of determining, by the controller, whether or not an actuator pressure of the engine clutch exceeds a first set pressure and is then changed to below the first set pressure when the actuator stroke is increased, as a result of performing the stroke sensing operation; a torque comparing operation of comparing, by the controller, transfer a torque of the engine clutch with a set torque when the actuator pressure exceeds the first set pressure and is then operated to below the first set pressure, as a result of performing the first pressure comparing operation; and an open determining operation of determining, by the controller, that the engine clutch is in an open state when the transfer torque of the engine clutch is the set torque or less, as a result of performing of performing the torque comparing operation.

The stroke sensing operation may include an stop sensing operation of checking, by the controller, whether there is no change of the actuator stroke of the engine clutch at the time of performing a key start of an engine, an increase sensing operation of checking, by the controller, whether or not the actuator stroke of the engine clutch is increased when the change of the actuator stroke occurs, as a result of performing the stop sensing operation, and a decrease sensing operation of checking, by the controller, whether or not the actuator stroke of the engine clutch is decreased when the actuator stroke is not increased, as a result of performing the increase sensing operation.

The method may further include a revolutions per minute (RPM) comparing operation of comparing, by the controller, a difference between an engine RPM and a motor RPM with a set speed when the actuator pressure is maintained to the first set pressure or less, or exceeds the first set pressure and is then not changed to below the first set pressure as a result of performing the first pressure comparing operation; a slip determining operation of determining, by the controller, that the engine clutch is in a slip state when the difference between the engine RPM and the motor RPM is greater than the set speed as a result of performing the RPM comparing operation; and a lock up determining operation of determining, by the controller, that the engine clutch is in a lock up state when the difference between the engine RPM and the motor RPM is the set speed or less as a result of performing the RPM comparing operation.

The controller may subsequently perform the decrease sensing operation during the stroke sensing operation if the open determining operation is performed, and the controller may subsequently perform the increase sensing operation during the stroke sensing operation if the slip determining operation or the lock up determining operation is performed.

The controller may perform the RPM comparing operation when there is no change of the actuator stroke as a result of performing the stroke sensing operation.

The controller may perform the RPM comparing operation when the transfer torque of the engine clutch exceeds the set torque as a result of performing the torque comparing operation.

The method may further include a second pressure comparing operation of comparing, by the controller, the actuator pressure of the engine clutch with a second set pressure when the actuator stroke is decreased as a result of performing the stroke sensing operation, wherein the controller performs the torque comparing operation when the actuator pressure is less than the second set pressure as a result of performing the second pressure comparing operation.

The controller may perform the RPM comparing operation when the actuator pressure is the second set pressure or more as a result of performing the second pressure comparing operation.

DETAILED DESCRIPTION OF THE EXEMPLARY EMBODIMENTS

Hereinafter, a method for determining a connection state of an engine clutch according to exemplary embodiments of the present invention will be described with reference to the accompanying drawings.

Figure 1:
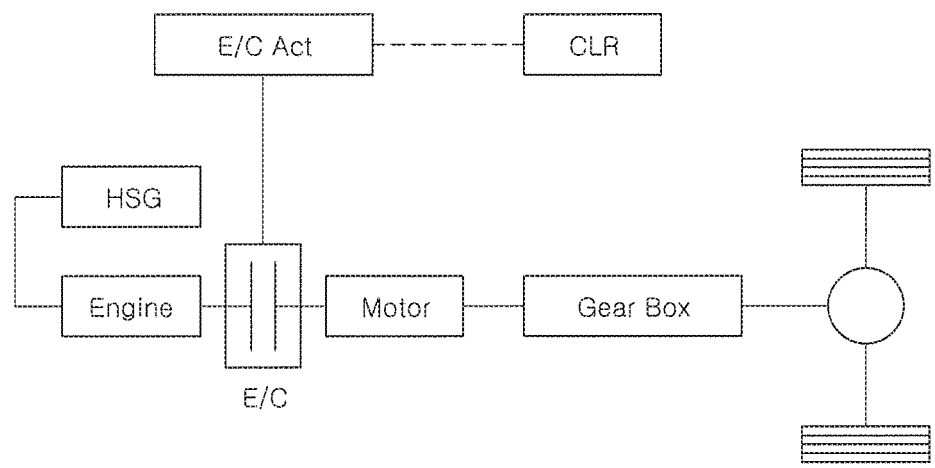
FIG. 1 is a view illustrating a structure a hybrid vehicle according to an exemplary embodiment of the present disclosure.

First, FIG. 1 is a view illustrating a structure a hybrid vehicle according to an exemplary embodiment of the present disclosure. The hybrid vehicle illustrated in FIG. 1 has a layout of a transmission mounted electric device (TMED) type in which an engine, a motor, and a gear box of a transmission are arranged in a line. In particular, the engine and the motor are connected to each other to be able to transfer power through an engine clutch (E/C). In addition, a hybrid starter generator (HSG), which is a starter generator providing torque to the engine at the time of starting the vehicle, is connected to the engine.

As such, the hybrid vehicle is driven in a driving mode such as an electric vehicle (EV) mode, which is the electric vehicle mode using only torque of a motor for drive, a hybrid electric vehicle (HEV) mode using the torque of the motor as auxiliary power while using torque of the engine as main power, or the like.

In such a hybrid vehicle, a mode conversion between the EV mode and the HEV mode, which is a main function, is a factor that heavily influences drivability, fuel efficiency, and power performance of the hybrid vehicle. Therefore, an accurate control of a slip and synchronization of the engine clutch (E/C) significantly influences the drivability and the power performance of the hybrid vehicle.

According to the related art, the connection state of the engine clutch was checked using transfer torque of the engine clutch and the speed, difference between the front and rear stages of the engine clutch. In this case, when the vehicle is driven by the motor by opening the engine clutch while performing a charging of the motor at an idle RPM of the engine, engine speed and motor speed are accidentally synchronized with each other and the engine clutch (E/C) is actually in an open state, but a case in which a controller CLR, such as an engine control unit (ECU), misjudges the engine clutch (E/C) as a lock up state may occur. In addition, the engine clutch was actually locked up due to a situation such as leak of hydraulic oil, or the like, but a case in which the engine clutch is misjudged as an open state only by the transfer torque of the engine clutch has occurred.

As described above, according to the related art, since the connection state of the engine clutch is simply determined using only the transfer torque of the engine clutch and the speed difference between the front and rear stages of the engine clutch, it was difficult to precisely detect a state of the engine clutch.

Therefore, the present technology is intended to provide a method for more precisely determining a connection state of an engine clutch. A detailed method for determining a connection state of an engine clutch is as follows.

Figure 2:
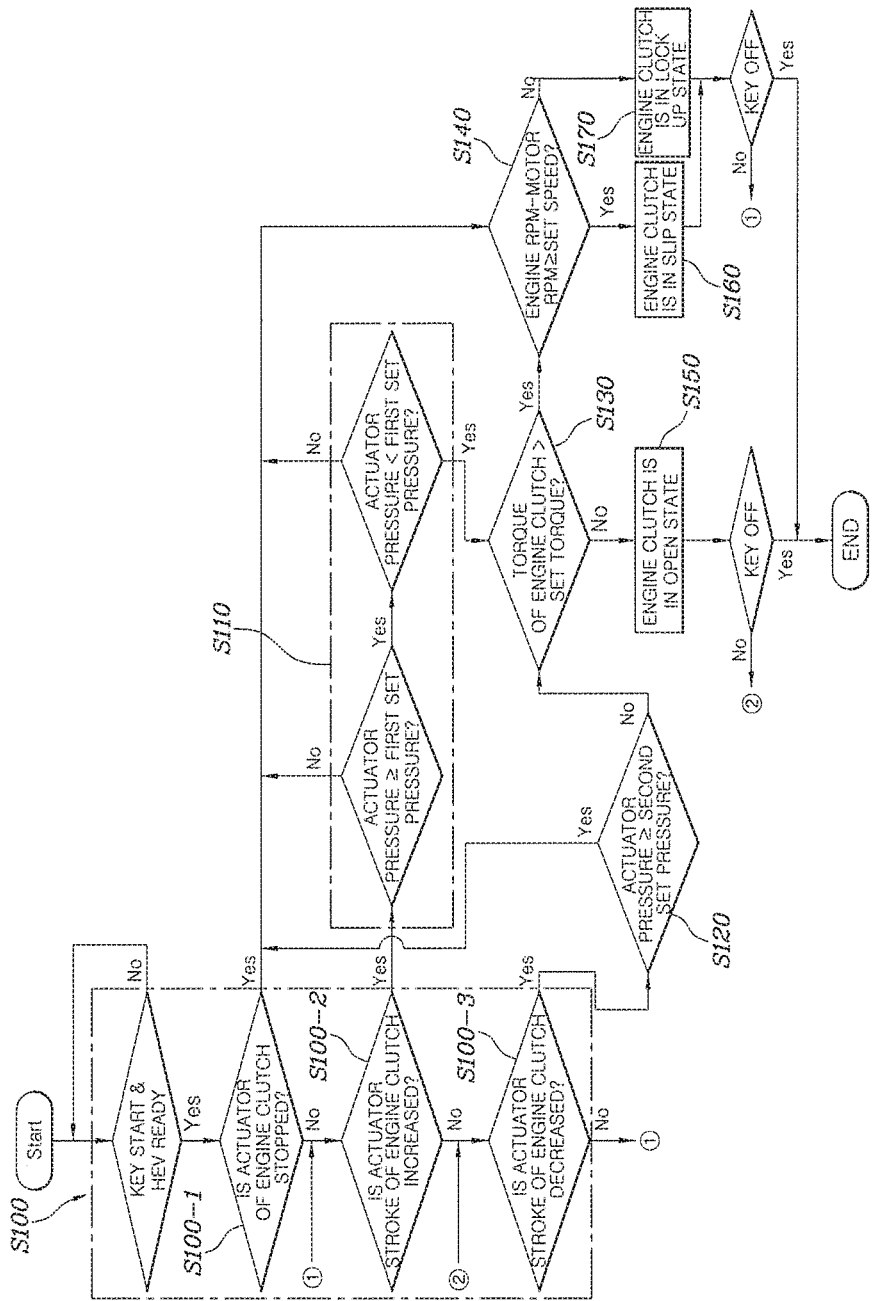
FIG. 2 is a flowchart illustrating a method for determining a connection state of an engine clutch according to an exemplary embodiment of the present disclosure.

FIG. 2 is a flowchart illustrating a method for determining a connection state of an engine clutch according to an exemplary embodiment of the present disclosure. Referring to FIG. 2, the method for determining a connection state of an engine clutch may include a stroke sensing operation (S100) of sensing, by a controller (CLR), a change of an actuator stroke of an engine clutch (E/C); a first pressure comparing operation (S110) of determining, by the controller, whether or not actuator pressure of the engine clutch exceeds a first set pressure and is then changed to below the first set pressure, when the actuator stroke is increased, as a result of performing the stroke sensing operation (S100); a torque comparing operation (S130) of comparing, by the controller, transfer torque of the engine clutch with set torque when the actuator pressure exceeds the first set pressure and is then operated to below the first set pressure, as a result of performing the first pressure comparing operation (S110); and an open determining operation (S150) of determining, by the controller, that the engine clutch is in an open state when the transfer torque of the engine clutch is the set torque or less, as a result of performing the torque comparing operation (S130).

Figure 3:
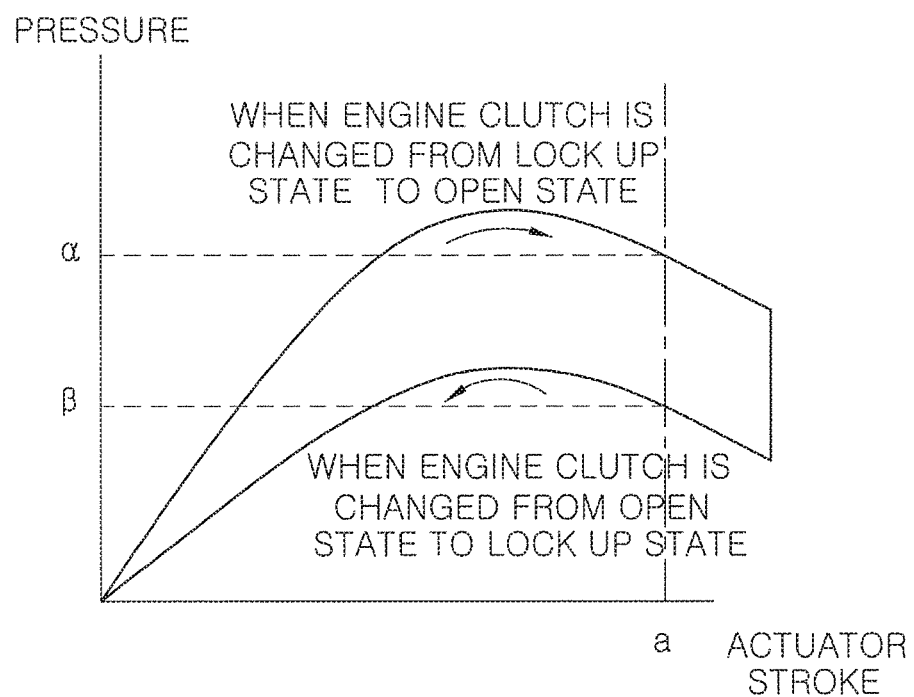
FIG. 3 is a graph illustrating actuator pressure and stroke characteristics of the engine clutch according to an exemplary embodiment of the present disclosure.
Figure 4:
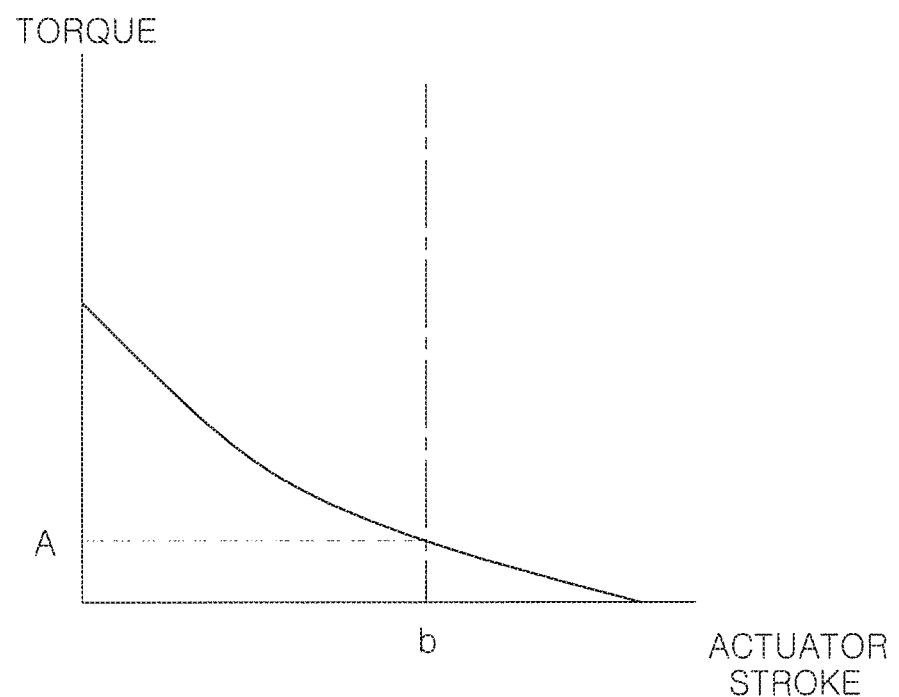
FIG. 4 is a graph illustrating transfer torque and stroke characteristics of the engine clutch according to an exemplary embodiment of the present disclosure.

In order to help an understanding of the method for determining a connection state of an engine clutch described above, a description will be provided with reference to FIGS. 3 and 4. FIG. 3 is a graph illustrating actuator pressure and stroke characteristics of the engine clutch according to an exemplary embodiment of the present disclosure, and FIG. 4 is a graph illustrating transfer torque and stroke characteristics of the engine clutch according to an exemplary embodiment of the present disclosure.

The engine clutch according to the present technology may be a normal close type, and may include a diaphragm spring.

In the case in which the engine clutch is changed from the lock up state to the open state, a phenomenon occurs in which the actuator pressure is initially increased as the actuator stroke is increased, and actuator internal pressure is rather decreased as the actuator stroke is increased. after the diaphragm spring is tilted, as illustrated in FIG. 3.

In contrast, in the case in which the engine clutch is changed from the open state to the lock up state, characteristics is shown in which the actuator pressure is also initially increased as the actuator stroke is decreased and the actuator pressure is decreased as the actuator stroke is decreased after the diaphragm is tilted. Here, based on a point a, a left region is a section in which the engine clutch is locked up or slipped, and a right region is a section in which the engine clutch is opened.

Further, the actuator stroke of the engine clutch shows characteristics which are inversely proportional to the transfer torque as illustrated in FIG. 4. That is, as the actuator stroke of the engine clutch is increased, the transfer torque transferred from the engine to the motor is decreased. Here, it is estimated based on a point b of FIG. 4 that the engine clutch is locked up or slipped in a left region, and is in the open state in a right region.

The present technology uses the actuator stroke change of the engine clutch, the actuator pressure, and the transfer torque of the engine clutch in order to determine the connection state of the engine clutch based on characteristics change according to the connection state of the engine clutch illustrated in FIGS. 3 and 4.

Specifically, referring to FIGS. 2 to 4, first, the controller (CLR) performs the stroke sensing operation (S100) to sense actuator stroke change characteristics of the engine clutch.

The stroke sensing operation (S100) may include an stop sensing operation (S100-1) of checking, by the controller, whether there is no change of the actuator stroke of the engine clutch at the time of performing a key start of an engine, an increase sensing operation (S100-2) of checking, by the controller, whether or not the actuator stroke of the engine clutch is increased when the change of the actuator stroke occurs, as a result of performing the stop sensing operation (S100-1), and a decrease sensing operation (S100-3) of checking, by the controller, whether or not the actuator stroke of the engine clutch is decreased when the actuator stroke is not increased, as a result of performing the increase sensing operation (S100-2).

If the controller senses an increase phenomenon of the actuator stroke of the engine clutch through the increase sensing operation (S100-2) of the stroke sensing operation (S100), it is determined whether the actuator pressure exceeds a first set pressure and is again changed to below the ret set pressure (S110) as in a pressure-stroke graph illustrated in FIG. 3. Here, the first set pressure is set to an actuator pressure value when the engine clutch is changed to the open state, and is indicated by α in FIG. 3.

If the actuator pressure exceeds the first set pressure and is again changed to below the first set pressure, there is high probability of the open state of the engine clutch. In order to accurately perform the determination, it is checked whether the transfer torque of the engine clutch is less than set torque (A) as in a torque-stroke graph illustrated in FIG. 4. If the transfer torque of the engine clutch is less than the set torque (A), it may be accurately determined that the engine clutch is in the open state. Here, the set torque (A) is set to a torque transfer value of the engine clutch of a time point at which the actuator stroke is increased and the engine clutch is changed to the open state.

In contrast, the method for determining a connection state of an engine clutch may further include an RPM comparing operation (S140) of comparing, by the controller, a difference between an engine RPM and a motor RPM with a set speed when the actuator pressure is maintained to the first set pressure or less, or exceeds the first set pressure and is not changed to below the first set pressure as a result of performing the first pressure comparing operation (S110); a slip determining operation (S160) of determining, by the controller, that the engine clutch is in a slip state when the difference is greater than the set speed as a result of performing the RPM comparing operation (S140); and a lock up determining operation (S170) of determining, by the controller, that the engine clutch is in a lock up state when the difference is the set speed or less as a result of performing the RPM comparing operation (S140).

That is, if the change of the actuator pressure is not operated as illustrated in FIG. 3 in the situation in which the actuator stroke is increased, it may be determined that the engine clutch (E/C) maintains the slip or lock up state.

However, in order to more accurately determine the connection state of the engine clutch, speeds of the front and rear stages of the engine clutch, that is, a speed difference between the engine RPM and the motor RPM is compared with a preset speed (S140). Here, if the speed difference is the set speed or more, it is determined that the engine clutch is in the slip state (S160) because engine power is partially transferred to the motor, and if the speed difference is less than the set speed, it is determined that the engine clutch is the lock up state (S170) because the engine power is transferred to the motor.

Therefore, the slip state or the lock up state of the engine clutch may be clearly classified.

In this case, if the controller performs the open determining operation (S150), the controller may subsequently perform the decrease sensing operation (S100-3) during the stroke sensing operation, and if the controller performs the slip determining operation (S160) or the lock up determining operation S170), the controller may subsequently perform the increase sensing operation (S100-2) during the stroke sensing operation.

That is, since the engine clutch continuously maintains the open state until the actuator stroke is sensed after it is determined that the engine clutch is in the open state, the controller may perform only the decrease sensing operation (S100-3).

The controller determines an initial connection state of the engine clutch by checking once whether the engine clutch is in a stop state immediately after a key start of the engine. As a result of performing the stop sensing operation (S100-1) during the stroke sensing operation (S100), if there is no change of the actuator stroke, the controller performs the RPM comparing operation (S140).

That is, if the actuator of the engine clutch is in the stop state after the key state of the vehicle, since the engine clutch is provided as the normal close type, it may be determined that the engine clutch is in the slip state or the lock up state, and in order to more precisely diagnose, the controller performs the RPM comparing operation (S140).

In addition, as a result of performing the torque comparing operation (S130), if the transfer torque of the engine clutch exceeds the set torque, the controller performs the RPM comparing operation (S140).

That is, in a situation in which the actuator stroke is increased, the actuator pressure shows characteristics that it exceeds the first set pressure and is operated to below the first set pressure, the toque comparing operation (S130) is performed in order to confirm that the engine clutch is in the open state. If the transfer torque of the engine clutch exceeds the set torque as a result of performing the torque comparing operation (S130), it may be determined that the engine clutch is in the slip or lock up state. Therefore, the controller performs the RPM comparing operation (S140) to detect an accurate connection state of the engine clutch.

Further, the present technology further includes a second pressure comparing operation (S120) of comparing, by the controller, the actuator pressure of the engine clutch with a second set pressure when the actuator stroke is decreased as a result of performing the decrease sensing operation (S100-3) during the stroke sensing operation (S100), and as a result of performing the second pressure comparing operation (S120), if the actuator pressure is less than the second set pressure, the controller may perform the torque comparing operation (S130).

That is, in the case in which the actuator stroke of the engine clutch is decreased, if the actuator pressure is not changed to the second set pressure β or more, there is high probability of the open. state of the engine clutch. Therefore, in order to accurately determine whether the engine clutch is in the open state, transfer torque characteristics of the engine clutch are checked (S130).

In contrast, as a result of performing the second pressure comparing operation (S120), if the actuator pressure is the second set pressure β or more, the controller may perform the RPM comparing operation (S140).

That is, in a situation in which the actuator stroke of the engine clutch is decreased, if the actuator pressure is changed to the second set pressure β or more, this is a situation in which the engine clutch is in the slipped or locked up. Therefore, in order to more precisely determine the connection state of the engine clutch, the RPM comparing operation (S140) may be performed.

To additionally describe for understanding, as illustrated in FIG. 2, after the open determining operation (S150), the slip determining operation (S160), and the lock up determining operation (S170), it is determined whether or not a key off of the vehicle is performed. If the key off of the vehicle is performed, a control logic ends, and if the key off of the vehicle is not performed, the stroke sensing operation (S100) is performed, thereby making it possible to continuously determine the connection state of the engine clutch.

As set forth above, according to the exemplary embodiments of the present disclosure, the method for determining the connection state of the engine clutch may determine an accurate connection state of the engine clutch, thereby making it possible to prevent an abnormal behavior of the vehicle using a more accurate vehicle control.

Although the present disclosure is shown and described in connection with the specific embodiments, it is apparent to those skilled in the art that the modifications and variations can be made without departing from the spirit and scope of the invention as defined by the appended claims.

What is claimed is:

1. A method for determining a connection of an engine clutch, the method comprising steps of:
    a stroke sensing operation of sensing, by a controller, a change of an actuator stroke of the engine clutch;
    a first pressure comparing operation of determining, by the controller, whether or not an actuator pressure of the engine clutch exceeds a first set pressure and is then changed to below the first set pressure when the actuator stroke increases, as a result of performing the stroke sensing operation;
    a torque comparing operation of comparing, by the controller, a transfer torque of the engine clutch with a set torque when the actuator pressure exceeds the first set pressure and is then operated to below the first set pressure, as a result of performing the first pressure comparing operation; and
    an open determining operation of determining, by the controller, that the engine clutch is in an open state when the transfer torque of the engine clutch is the set torque or less, as a result of performing the torque comparing operation.

2. The method of claim 1, wherein the stroke sensing operation includes:
    a stop sensing operation of checking, by the controller, whether there is no change of the actuator stroke of the engine clutch at the time of performing a key start of an engine,
    an increase sensing operation of checking, by the controller, whether or not the actuator stroke of the engine clutch is increased when the change of the actuator stroke occurs, as a result of performing the stop sensing operation, and
    a decrease sensing operation of checking, by the controller, whether or not the actuator stroke of the engine clutch is decreased when the actuator stroke is not increased, as a result of performing the increase sensing operation.

3. The method of clam 2, further comprising:
    a revolutions per minute (RPM) comparing operation of comparing, by the controller, a difference between an engine RPM and a motor RPM with a set speed when the actuator pressure is maintained to the first set pressure or less, or exceeds the first set pressure and is then not changed to below the first set pressure as a result of performing the first pressure comparing operation;
    a slip determining operation of determining, by the controller, that the engine clutch is in a slip state when the difference between the engine RPM and the motor RPM is greater than the set speed as a result of performing the RPM comparing operation; and
    a lock up determining operation of determining, by the controller, that the engine clutch is in a lock up state when the difference between the engine RPM and the motor RPM is the set speed or less as a result of performing the RPM comparing operation.

4. The method of claim 3, wherein the controller subsequently performs the decrease sensing operation during the stroke sensing operation if the open determining operation is performed, and the controller subsequently performs the increase sensing operation during the stroke sensing operation if the slip determining operation or the lock up determining operation is performed.

5. The method of claim 4, wherein the controller performs the RPM comparing operation when there is no change of the actuator stroke as a result of performing the stroke sensing operation.

6. The method of claim 4, wherein the controller performs the RPM comparing operation when the transfer torque of the engine clutch exceeds the set torque as a result of performing the torque comparing operation.

7. The method of claim 4, further comprising a second pressure comparing operation of comparing, by the controller, the actuator pressure of the engine clutch with a second set pressure when the actuator stroke is decreased as a result of performing the stroke sensing operation,
    wherein the controller performs the torque comparing operation when the actuator pressure is less than the second set pressure as a result of performing the second pressure comparing operation.

8. The method of claim 7, wherein the controller performs the RPM comparing operation when the actuator pressure is the second set pressure or more as a result of performing the second pressure comparing operation.

* * * * *